United States Patent [19]

Tsukui et al.

[11] Patent Number: 4,537,840
[45] Date of Patent: Aug. 27, 1985

[54] FUEL CELL USING ORGANIC, HIGH-MOLECULAR WEIGHT ELECTROLYTE

[75] Inventors: Tsutomu Tsukui, Hitachi; Toshio Shimizu, Katsuta; Ryota Doi, Naka; Yasuyuki Tsutsumi, Hitachi, all of Japan

[73] Assignee: Hitachi, Ltd., Tokyo, Japan

[21] Appl. No.: 519,264

[22] Filed: Aug. 1, 1983

[30] Foreign Application Priority Data

Jul. 30, 1982 [JP] Japan .................. 57-132237

[51] Int. Cl.³ ................................. H01M 8/08
[52] U.S. Cl. ..................... 429/33; 429/34; 429/35
[58] Field of Search ............ 429/46, 33, 30, 34, 429/35

[56] References Cited

U.S. PATENT DOCUMENTS

| | | | |
|---|---|---|---|
| 3,284,238 | 11/1966 | White | 429/33 |
| 3,341,366 | 9/1967 | Hodgdou, Jr. et al. | 429/33 |
| 3,419,430 | 12/1968 | Michaels | 429/46 |

*Primary Examiner*—Anthony Skapars
*Attorney, Agent, or Firm*—Antonelli, Terry & Wands

[57] ABSTRACT

Disclosed is a fuel cell using as an electrolyte an organic, high-molecular weight electrolyte. The fuel cell of the present invention can prevent the leakage of an electrolyte from an electrolyte chamber so that an electrical short-circuit between an anode and a cathode can be avoided. Moreover, use of the disclosed electrolytes permits the fuel to be fed to the fuel chamber by itself or in admixture with water, but without being mixed with electrolyte.

26 Claims, 8 Drawing Figures

FUEL CELL USING ORGANIC, HIGH-MOLECULAR WEIGHT ELECTROLYTE

FIELD OF THE INVENTION

The present invention relates to a novel fuel cell using an organic, high-molecular weight electrolyte and, more particularly, to a fuel cell which contains a novel electrolyte and which operates at room temperature or at a temperature of at most about 100° C.

Moreover, the present invention relates to an electrolyte structure and an electrolyte composition which are suitable for the above fuel cell.

The present invention is suitable for application both to fuel cells which use a gaseous fuel, such as hydrogen, or those which use a liquid fuel, such as methanol or hydrazine, and for gaseous oxidizers such as oxygen or air or liquid oxidizers, such as hydrogen peroxide. However, the present invention should not be limited to such fuel cells.

BACKGROUND OF THE INVENTION

A fuel cell is designed to extract the energy generated by the electrochemical reaction of a fuel and an oxidizer directly as electric energy, and is either being researched or is already practiced as either an electric power plant or a power source for aerospace devices, unmanned facilities on sea or shore, stationary or movable radios, automobiles or domestic appliances.

Fuel cells can be divided roughly into representative types such as molten salt electrolyte types of fuel cell, which operate at a high temperature (e.g., about 500° to 700° C.), phosphoric electrolyte types of fuel cell, which operate in the vicinity of 200° C., or alkaline or acidic electrolyte types of fuel cell, which operate at room temperature or at a temperature of at most about 100° C.

For the electrolyte of high-temperature fuel cells, carbonates such as $K_2CO_3$, which are solid at room temperatures, have frequently been used.

Phosphoric fuel cells use phosphoric acid having a melting point of about 42° C., or polyphosphoric acid, as disclosed in the specification of Japanese Pat. Laid-Open No. 5286/1982, both of which are solid or semi-solid at room temperatures.

The electrolyte frequently used in alkaline or acidic electrolyte types of fuel cell used at a temperature of at most 100° C. is either an aqueous solution of caustic potash, caustic soda or lithium hydroxide, or dilute sulfuric acid. This is because aqueous solutions of these strong electrolytes are the most convenient for use because they have a high ionic conductivity at a low temperature.

Those strong electrolytic substances are so corrosive that they restrict the materials that can be used for composing the cell. This means that sufficient care must be taken to prevent those electrolytes from leaking from a cell. However, counter-measures against leakage of electrolyte in existing cells are not very simple, so that a variety of trials have been made in the prior art.

The basic problem is raised from the fact that the electrolyte is a liquid when the fuel or oxidizer is liquid. The phenomenon occurs that the electrolyte which should stay in the electrolyte chamber passes through a porous fuel or oxidizer electrode into the fuel or oxidizer chamber as a result of dilution due to the concentration gradient within the liquid fuel or oxidizer.

In a fuel cell using a liquid fuel, it is customary as a counter-measure to supply the fuel chamber with a fuel mixture (which is usually called an anodic electrolyte) which has been diluted with the electrolyte. The difference in the concentration of the electrolyte is so reduced by this that outflow of the electrolyte from the electrolyte chamber to the fuel chamber is reduced. Nevertheless, the dilution of the fuel with the electrolyte is a counter-measure which is unnecessary for the intrinsic functions of the cell, and the concentration of the fuel is also reduced accordingly so that more power is consumed for circulating the electrolyte than the fuel, with a resultant reduction in the energy efficiency. Moreover, the supply or circulation of the highly corrosive electrolyte together with the fuel is disadvantageous for the user, in addition to the limitations on the constructional materials.

Although there is an example in which an inorganic powder is mixed with the electrolyte to make a paste, this method has not succeeded in providing a basic counter-measure because the fuel or oxidizer electrode will essentially allow the electrolyte to pass therethrough.

SUMMARY OF THE INVENTION

It is an object of the present invention to provide a fuel cell which can prevent or reduce leakage or outflow of the electrolyte thereof.

Another object of the present invention is to provide a novel fuel cell which does not use a highly corrosive electrolyte.

A third object of the present invention is to provide an electrolyte structure and an electrolyte composition which are suitable for the above fuel cell.

The present invention is based upon the concept of the principle that the use of an electrolyte which is incapable of passing through a porous fuel or oxidizer electrode makes it possible to prevent outflow or leakage of the electrolyte in a liquid fuel or oxidizer type of fuel cell of the prior art. The inventors have examined the use of an organic, high-molecular weight electrolyte (e.g., a polymer material) as one having the above actions and have confirmed better effects than those anticipated after the assembly of a methanol fuel cell and power-generation experiments.

DESCRIPTION OF THE INVENTION (a) Organic, High-Molecular Weight Electrolyte

Organic, high-molecular weight electrolytes are well-known substances that are disclosed in detail in "High-Molecular Weight Electrolytes", edited by the Editing Committee of High-Molecular Weight Experiments of the High-Molecular Weight Association and published in 1978 by Kyoritsu Shuppan K.K.

A high-molecular weight electrolyte dissociates in an aqueous solution to produce large high-molecular weight ions with high charges and low-molecular weight ions. The high-molecular weight electrolyte itself in the solution becomes high-molecular weight ions (i.e., polyions) which have opposite charges to those of the low-molecular weight ions, while liberating the low-molecular weight ions from their dissociated radicals. The low-molecular weight ions thus liberated are called "counter-ions". The high-molecular weight ions have charges at levels corresponding to the number of dissociated ionized radicals.

The counter-ions thus liberated through dissociation from the high-molecular weight ions are trapped around the high molecular weight molecules by the action of an electric field resulting from the high charges of the high-molecular weight ions of the opposite polarity. If the counter-ions are trapped or restrained around the high-molecular weight ions merely by electrostatic action, the counter-ions thus trapped can migrate freely within the trapped layer. This restraint is called "$\phi$ bonding".

On the other hand, the bonding by which the counter-ions are trapped by the high molecular weight molecules in the form containing covalent bonds with the dissociated radicals is called "P-bonding". In this case, the counter-ions are restrained by specific dissociated radicals so that they cannot migrate freely.

Since the high-molecular weight ions have large molecules, it is thought that their migrations in the solution of the high-molecular weight electrolyte are restricted so that they cannot migrate from the electrolyte chamber either to the outside or into the fuel or oxidizer chamber.

As has been described above, by making use of both the limited restraint on the counter-ions and the restriction on the migration of the high-molecular weight ions, the fuel cell according to the present invention can provide a number of useful effects, as will be described later in more detail.

The kinds and the methods of regulating the high-molecular weight electrolyte are disclosed in detail in Section 2 of the aforementioned "High-Molecular Weight Electrolytes". In this publication, high-molecular weight electrolytes are classified into those which are produced from natural high-molecular weight molecules, those which are produced from synthetic high-molecular weight molecules, and special ones (all these are synthetic, high-molecular weight electrolytes).

The organic, high-molecular weight electrolytes suitable for use in the present invention are limited to those which can produce as many counter-ions as possible, namely, those having high ionic conductivities. For example, the minimum ionic conductivity may be $4 \times 10^{-3}$ (S/cm), where S is siemens ($\Omega^{-1}$). High-molecular weight acids and bases of strong electrolytes are especially suitable for the present invention. The high-molecular weight electrolytes should be ionized in the presence of water.

Suitable as electrolytes are both high-molecular weight bases, the dissociated radicals of which have basic groups such as amino groups or quaternary ammonium groups such as $-CH_2N(CH_3)_3Cl$ or $-CH_2N(CH_2CH_2OH)(CH_3)_2Cl$, and the high-molecular weight acids which have acidic groups such as sulfonic groups or phosphine groups.

The residue of the high-molecular weight electrolyte may be, for example, polystyrene, polyethylene, polyacryl, polymethacryl, a styrene-butadiene copolymer or a styrene-divinylbenzene copolymer, which is either sulfonated with sulfuric acid or is subjected to a chloromethylating treatment with a tertiary amine into a quaternary ammonium group.

This high-molecular weight electrolyte has no critical molecular weight, but there can be used a high-molecular weight substance having a molecular weight, measured as described below, of at least 1,000, particularly 10,000, in order to prevent its outflow or leakage from the electrolyte chamber. In this respect, an ordinary synthetic high-molecular weight substance has a molar weight of at least 100,000, so that no practical problem is raised. These molecular weights are as measured by the method of light scattering wherein a high-molecular weight material is dissolved in a solvent and a molecular weight M is calculated by an equation $\tau = HCM$, where C is a concentration of the polymer, H is a constant determined by the measuring conditions, and $\tau$ is a cloudiness of the solution.

(b) Electrolyte Composition

The high-molecular weight electrolyte is partially or completely dissolved in water; but when it fills the electrolyte chamber of the fuel cell, it is dissolved either by itself or partially or completely in water in accordance with either necessity or the type of fuel cell.

When the high-molecular weight electrolyte is used by itself, it may take the form of a powder, fine particles or pellets or any combination thereof. Such material may have a particle size of, e.g., several $\mu$m to less than a micron (submicron). For a methanol fuel cell, for example, the high-molecular weight electrolyte will swell into or be dissolved in the water before long because methanol and water are mixed and supplied as the fuel.

If a thickening agent is mixed in to increase the viscosity of the solution or paste of a high-molecular weight electrolyte obtained by swelling, dissolving or dispersing the electrolyte in water, it becomes feasible to apply the solution or paste onto an electrolyte holding frame. To accomplish such result, the solution or paste should have a viscosity increased to, e.g., between $10^2$ and $10^4$ poises. An additive amount of the thickening agent can be, e.g., 0.005 to 0.03 ml/cm$^2$. Such additive amount stated above represents an amount of the thickening agent present in the unit surface area of the electrode and, in the present case, was determined with respect to an electrode 200 microns thick. For the thickening agent, used is either a fine inorganic powder having a high specific resistance or an insulating property, for example, a fine powder of silicon carbide or an organic powder. Besides silicon carbide, powders of, e.g., $Al_2O_3$, $SiO_2$, $ZrO_3$, etc. can be used as a thickening agent. Moreover, examples of organic powders which can be used as a thickening agent include powders of polystyrene, polyethylene, polystyrene-divinylbenzene copolymer, etc. An exemplary size range for the inorganic or organic powders would be particle sizes of several $\mu$m to sub-micron. The term "thickening agent" is merely made for convenience; e.g., silicon carbide powder plays the role of a spacer for holding the electrolyte layer and the fuel or oxidizer electrode at a constant spacing. Hence, the thickening agent could also be called a "spacer material". It is best if this thickening agent is inactive to the electrolyte and water.

If another, low-molecular weight electrolyte (e.g., ethylene sulfonate polymer, styrene sulfonate polymer, etc., and having a molecular weight as low as several hundred, measured as discussed previously) is added to the solution or paste of the high-molecular weight electrolyte, it is dissociated to produce positive and negative ions. If only a small quantity thereof is added, e.g., 5 to 20% by weight of the low molecular weight electrolyte based on the total amount of the electrolyte, the restraint of the above counter-ions is weakened without losing the features of the high-molecular weight electrolyte so that the counter-ions become able to migrate.

Further additions of a variety of additives, if necessary, will not depart from the spirit and scope of the present invention. Such additives include those which can be added to conventional electrolytes of fuel cells.

(c) Electrolyte Structure

The ordinary fuel cell is constructed by preparing single cells of a combination of a fuel chamber - a fuel electrode - an electrolyte layer - an oxidizer electrode - an oxidizer chamber and connecting a plurality of these single cells in series to obtain the desired voltage. If a single cell has an electromotive force of 0.6 volts, a fuel cell having an electromotive force of 12 volts can be constructed by connecting twenty single cells in series. Therefore, each of the components making up a single cell should be shaped as a plate having as small a thickness as possible.

In one example of the present invention, the electrolyte structure can be made thinner if the above electrolyte composition is carried in a dry or paste form on a frame having a thickness of 0.1 to 5 mm, preferably 0.3 to 2 mm. It is also effective to apply an organic, high-molecular weight electrolyte composition to the adjacent sides of the oxidizer electrode and/or the fuel electrode.

In a methanol fuel cell, methanol will pass through the fuel electrode and leak into the electrolyte chamber until it reaches the oxidizer electrode where it will oxidize or burn. In order to prevent this, it is desirable to interpose a membrane restraining the passage of the methanol between the fuel electrode and the electrolyte chamber. Such membrane can have a thickness, preferably, of 0.05 to 1 mm, particularly 0.1 to 0.5 mm. An ion exchange film, for example, can be used as the membrane.

In one embodiment of the present invention, the thickness of the electrolyte structure is greatly reduced, and the assembly of the cell is facilitated, by attaching an ion exchange film to the electrolyte holding frame and by carrying the above electrolyte composition on either or both sides of the ion exchange film.

The electrolyte holding frame may be suitably made of an insulator which may be any of a variety of plastic plates, sheets or films, for example. It is possible to prevent the electrodes from short-circuiting if the above electrolyte composition mixed with a thickening agent or spacer material is used.

DETAILED DESCRIPTION OF PREFERRED EMBODIMENTS

Figure 1:
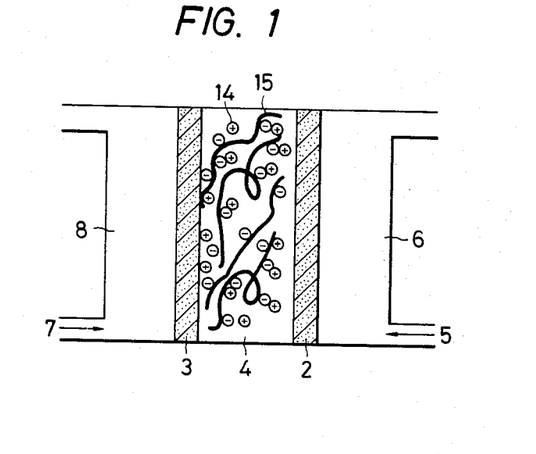
FIG. 1 is a schematic view explaining the principle of the fuel cell according to the present invention.

FIG. 1 is a schematic view showing the principle of the fuel cell according to the present invention, in which a fuel chamber 6 is supplied with a fuel 5 and an oxidizer chamber 8 is supplied with an oxidizer 7, such as oxygen, air or hydrogen peroxide. An organic, high-molecular weight electrolyte layer 4 is formed between a fuel electrode 2 and an oxidizer electrode 3. The fuel and oxidizer electrodes can be made of materials conventionally used for these electrodes of fuel cells. The high-molecular weight electrolyte dissociates in the presence of water into high-molecular weight ions 15 and ionized radicals 14. These ionized radicals 14 migrate within the electrolyte in accordance with the cell reactions to receive the electrons generated at the fuel electrode, and carry them to the oxidizer electrode. The high-molecular weight ions migrate neither to the oxidizer electrode nor the fuel electrode because they have large molecular weights.

If a methanol fuel cell is taken as an example, the following cell reactions occur:

at the methanol electrode (i.e., the ANODE):

$CH_3OH + H_2O \rightarrow CO_2 + 6H^+ + 6e^-$; and at the oxidizer electrode (i.e., the CATHODE):

$3/2 O_2 + 6H^+ + 6e^- \rightarrow 3H_2O$.

Figure 2:
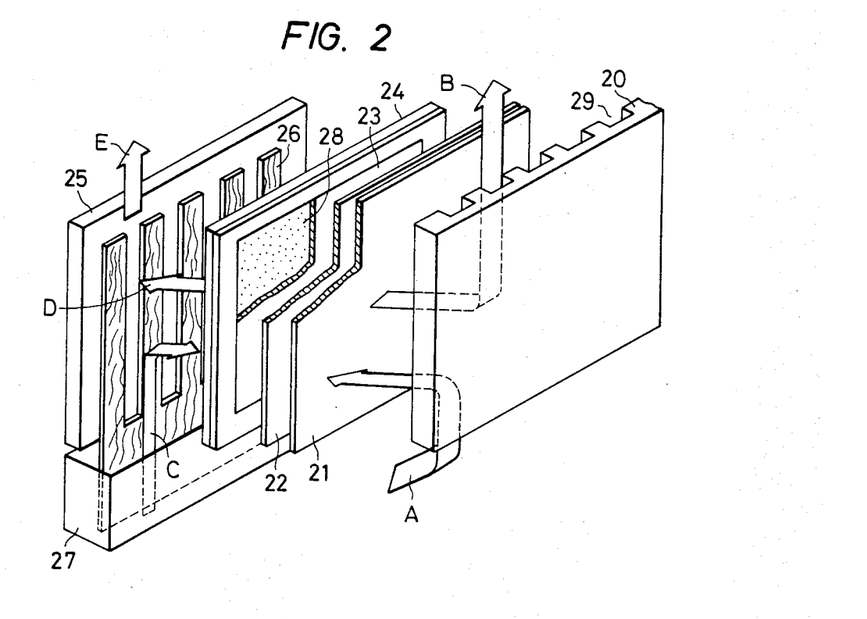
FIG. 2 is a partially cut-away perspective view showing the construction of a single cell of the fuel cell according to the present invention.

FIG. 2 is a perspective view showing the construction of a single cell of a methanol-air fuel battery according to one embodiment of the present invention.

As shown, a single cell is constructed by consecutively juxtaposing a separator 20 of graphite which forms an air chamber and acts as a collector, an air electrode 21 adjacent to the separator 20, ion exchange membrane 22, a layer 23 of a paste of a high-molecular weight electrolyte composition carried on a methanol electrode 28, and a separator 25 of graphite which forms a fuel chamber and acts as a collector. The separator 20 is formed with grooves 29 to provide air passages.

In the embodiment shown, a fibrous wick member 26 is provided which is used to supply the methanol from a methanol tank 27 to the fuel chamber by capillary action. This embodiment is featured by eliminating auxiliary machinery such as a pump for supplying or circulating the anolyte, and so is different from the methanol fuel cell of the prior art. If the pump is used, power for driving the pump is required not only during the start but also during running. The pump can be dispensed with if the cell has the construction shown in FIG. 2.

The reason for the fuel supply method shown in FIG. 2 is that the fuel cell according to the present invention makes it unnecessary to use an anolyte (i.e., the mixture of fuel and electrolyte). In the dilute sulfuric acid electrolyte type of methanol cell of the prior art, a large amount of sulfuric acid (20 to 70% by volume) has to be mixed with the anolyte. As a result, the wick system shown in FIG. 2 is difficult to adopt for supplying the necessary methanol because the concentration of the methanol is very low.

In the present invention, however, an anolyte need not be used; either methanol alone, or methanol to which a small quantity of water necessary for the reactions is added, can be used so that sufficient methanol can be supplied even by a wick system. As a result, auxiliary machinery for the fuel supply can be dispensed with so that the efficiency of the energy use can be increased.

In the Figure, incidentally arrow A indicates the flow of air, arrow B the flows of steam and air which are generated by the cell reactions, arrow C the flow of fuel, arrow D the flow of carbon dioxide gas which is generated by the cell reactions, and arrow E the flow of carbon dioxide gas which is discharged from the cell.

The ion exchange membrane 22 may be sandwiched between the methanol electrode 28 and the electrolyte paste 23. The methanol electrode 28 is held on a frame 24.

Figure 3:
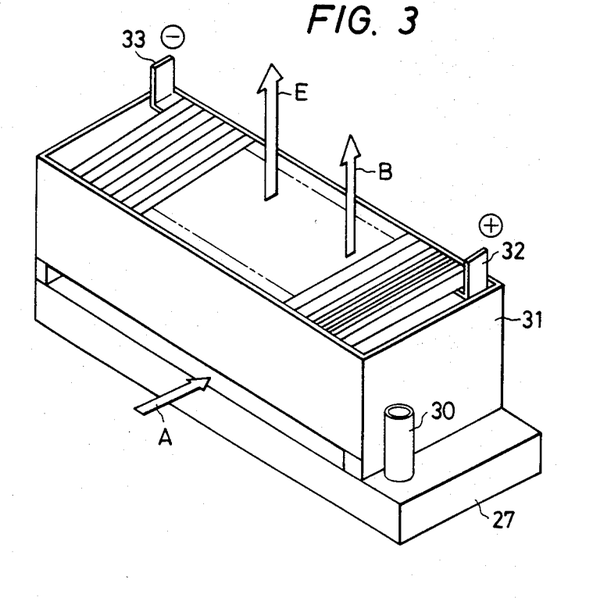
FIG. 3 is a perspective view showing the structure of a fuel battery which is constructed by connecting single cells in series.

FIG. 3 is a perspective view showing the appearance of the fuel battery which is constructed by laminating the single cells of FIG. 2. In FIG. 3, the same reference characters as those of FIG. 2 indicate the same parts and portions. The plurality of cells thus laminated are accommodated in a cell case 31 which has positive and negative terminals 32 and 33 attached thereto. Since the air supply system of FIG. 2 depends on natural convection, an epoch-making fuel cell is provided in that there is no requirement for auxiliary machinery supplying the fuel and air. The fuel is supplied from a port 30 to the tank 27.

Figure 4:
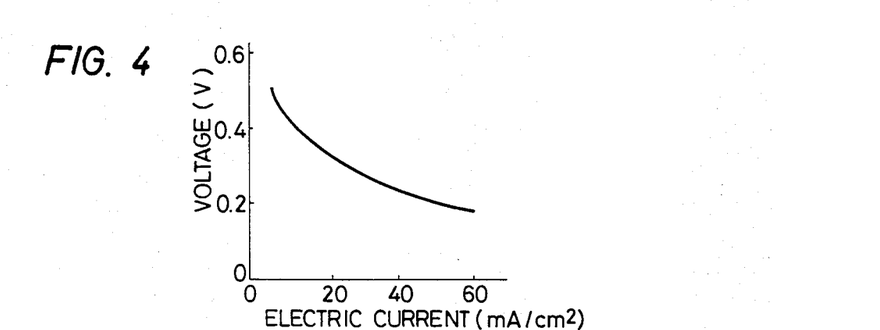
FIGS. 4 to 6 are graphs illustrating the V - I characteristics of a single cell of the fuel battery according to embodiments of the present invention.
Figure 5:
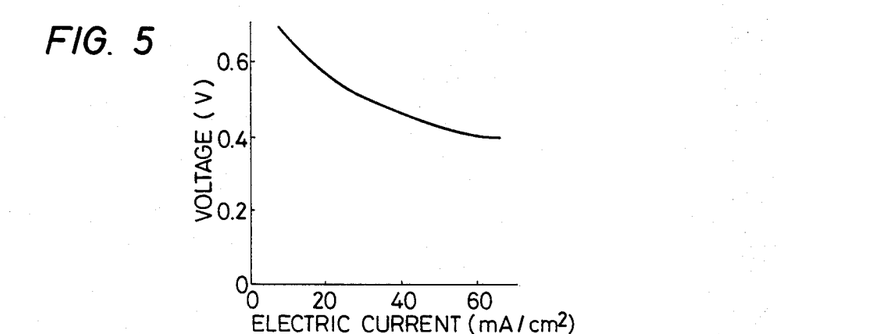
Figure 6:
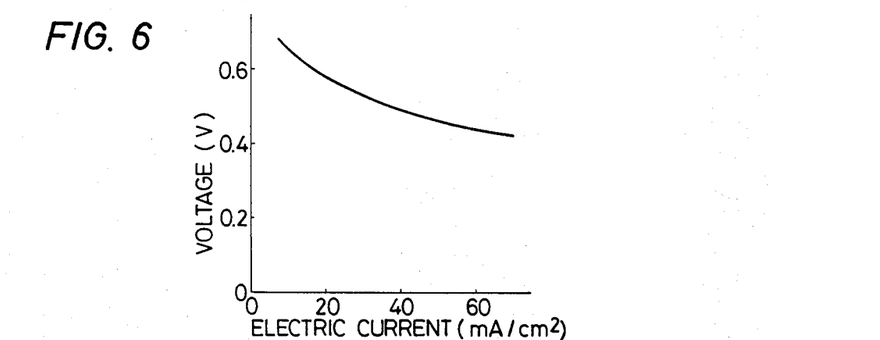

FIGS. 4, 5 and 6 are graphs illustrating the V - I characteristics of single cells according to various embodiments of the present invention, described later in this disclosure.

Figure 7:
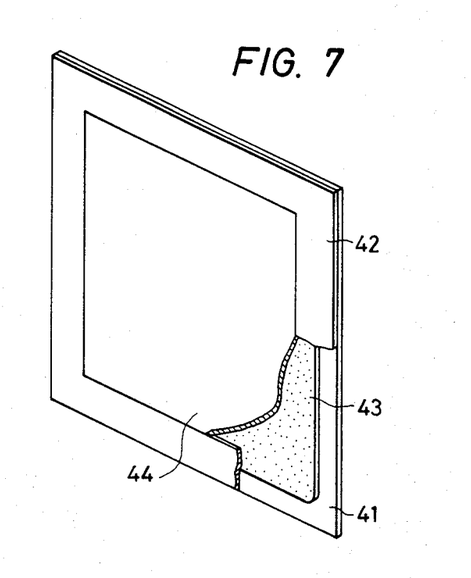
FIG. 7 is a partially cut-away perspective view showing the construction of an electrolyte structure according to the present invention.

FIG. 7 shows the construction of the electrolyte structure according to another embodiment of the present invention. The embodiment shown in FIG. 2 is constructed so that an electrolyte composition on which an ion exchange film is arranged is applied to the surface of the fuel electrode. In FIG. 5, on the other hand, the ion exchange film or membrane 43 is sandwiched between electrolyte frames 41 and 42 to be held thereby, and has a high-molecular weight electrolyte composition 44 applied to both or either of its sides. This construction makes it feasible to assemble a single cell.

Figure 8:
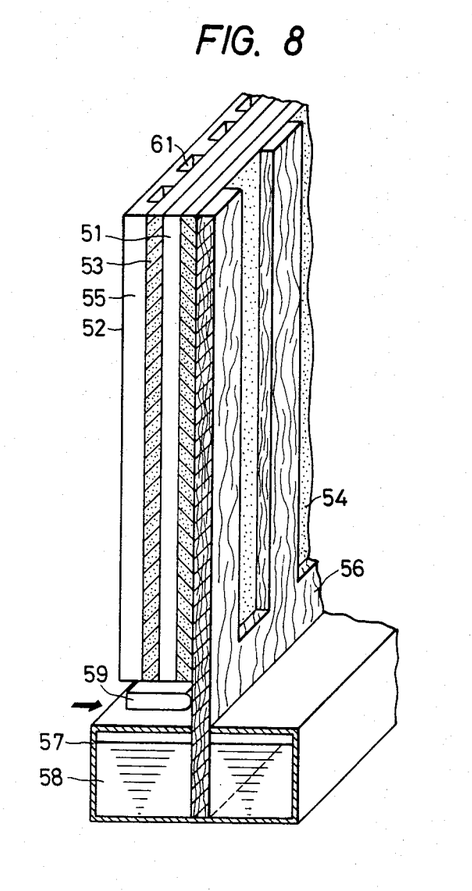
FIG. 8 is a sectioned perspective view explaining the fuel supply and control method of an embodiment of the present invention.

FIG. 8 is a sectioned perspective view showing one example of a method of supplying the fuel. Either fuel or a mixture of fuel and water in a fuel tank is supplied by capillary action to a fuel electrode 52 by means of a transparent fibrous wick 56. An electrolyte layer 51 is formed between the fuel electrode 52 and an oxidizer electrode 53. On the other side of the oxidizer electrode 53, a conductive spacer 55 formed with oxidizer passages 61 is mounted. As shown in FIG. 8, a stopper 59 is provided which can stop the fuel supply if it is pushed in the direction of the arrow when the operation of the fuel cell is to be interrupted.

EXAMPLES

Polystyrene sulfonic acid was used as the electrolyte of the fuel cell shown in FIG. 2, which used methanol directly as the fuel thereof.

The polystyrene sulfonic acid was prepared by sulfonation by causing dense sulfuric acid at 100° C. to act upon a film of polystyrene in the presence of a catalyst of 0.2% silver sulfate. The polystyrene dissolved into a viscous liquid. After about eight hours, the polystyrene was dissolved in water so that it could be purified to prepare the polystyrene sulfonic acid.

For the sulfonating process, incidentally, a process using a complex or adduct of $SO_3$ (e.g., $C_6H_5COOSO_3H$), or Eisenberg's method using 100% $H_2SO_4$ (as disclosed by W. R. Carroll, H. Eisenberg, J. Polymer Sci. 4, 599 (1966)) could be used.

An electrolyte paste obtained by kneading the polystyrene sulfonic acid with a suitable moisture content, was sandwiched to a thickness of about 0.2 mm between the two electrodes 24 and 21 which had been treated by a catalyst. As an example, the kneading of the paste was carried with a moisture content of about 5 to 30%. Because of the paste form, care was taken to prevent bubbles forming in the interfaces between the electrolyte and the electrodes either by applying the paste to the surfaces of the electrodes or by compressing them after they have been sandwiched together. The current (I) - voltage (V) characteristics of this cell are illustrated in FIG. 4.

In this way, the electrolyte is fixed. As a result, fuel without electrolyte can be supplied so that the outflow of acid is eliminated, to facilitate handling. An important feature obtainable because only fuel is supplied to the laminated cells shown in FIG. 3 is that not only the electrodes can be prevented from short-circuiting, but also the fuel supply structure can be simplified. Moreover, the fuel can be supplied directly from the fuel tank 27 by simplifying or omitting the fuel supply pump. This can also be applied to fuel cells (with either acidic or basic electrolytes) which have previously used a liquid electrolyte.

In another example, it is possible to use as the electrolyte of the fuel cell a paste electrolyte which has been kneaded with an electrolyte exhibiting the same acidic nature as that of the high-molecular weight acid exhibiting the acidic electrolyte of the above fuel cell, using methanol as its fuel. For example, polystyrene sulfonic acid and 3 mols of dilute sulfuric acid were kneaded into a paste which was sandwiched between the two electrodes 21 and 24 which had been treated with a catalyst. Suitable catalysts include, e.g., Pt, Pd, Ir, Ru or mixtures thereof. The thickness of the electrolyte after this treatment was 0.2 mm. Inorganic particles such as silicon carbide can be treated with a suspension of a fluorine resin and kneaded with the above polystyrene sulfonic acid and 3 mols of dilute sulfuric acid into a paste. For example, the particles can be agitated in a suspension of the fluorine resin to treat the particles. In this case, the suspension of fluorine resin acts as a binder and forms an electrolyte reserving layer so that it can act as an excellent electrolyte. This results in the excellent cell characteristics shown in FIG. 5.

In still another example, a paste of a high molecular weight acid (such as polystyrene sulfonic acid) is kneaded with a bead-shaped (having a size of, e.g., several $\mu$m to sub-microns), high-molecular weight acid (such as a styrene-divinylbenzene copolymer sulfonic acid), and the resultant mixture can be used as the electrolyte of the fuel cell. These materials are kneaded in amounts, for example, of a bead amount, preferably, of 40%–60% by weight, with 3–10% of high-molecular weight acids contained in the materials kneaded. For example, a substance obtained by kneading the above polystyrene sulfonic acid and a suitable moisture content (a suitable moisture content is, e.g., 5–30%) is kneaded with beads of the styrene-divinylbenzene copolymer sulfonic acid (having a particle diameter of a few $\mu$m) to prepare a paste, and this paste is used as the electrolyte of the fuel cell. In this case, beads of polystyrene sulfonic acid can be used instead of the above silicon carbide so that the concentration of hydrogen ions in the electrolyte is increased and the beads perform as the reserve layer for the electrolyte. As a result, the internal impedance of the fuel cell is reduced so that the excellent characteristics shown in FIG. 6 are exhibited.

The description thus far made is directed to examples in which a paste of a high-molecular weight acid is used as the electrolyte of a fuel cell. Nevertheless, such high-molecular weight acids can also be used in the form of a cross-linked gel.

For example, chlorosulfonic acid can react with crosslinked polystyrene in a solution of sulfuric acid so that it becomes a gel. By using this gel as the electrolyte of a fuel cell, it is possible to provide an electrolyte which is stable even for use over a prolonged period of time.

A combination of a high-molecular weight electrolyte and an ion exchange membrane can also be used as an electrolyte. For example, the high-molecular weight acid of polystyrene sulfonic acid and a film or a cation exchange film containing both styrene-butadiene or styrene-divinylbenzene in its parent body and a sulfonic group are combined with each other to prepare this electrolyte for a fuel cell. The electrolyte and membrane can be combined by coating a paste of the electrolyte on the ion-exchange membrane. In another case, the paste-like electrolyte can be sandwiched between a couple of membranes. In combining the high-molecular weight electrolyte and ion exchange membrane, the advantage can be obtained that the ion exchange membrane prevents the fuel from migrating from the fuel electrode 24 to the air electrode 21 so that the efficiency of fuel usage can be improved.

The above description is directed mainly to examples of fuel cells in which a liquid (i.e., methanol) using an acidic electrolyte is used as the fuel. In this case, however, polyethylene sulfonic acid or the like can be used by a similar process in addition to the use of polystyrene sulfonic acid as the electrolyte of the fuel cell.

A high-molecular weight acid can be used in a fuel cell, which employs a gas (such as hydrogen) as the fuel, with the same acidic electrolyte.

A high-molecular weight electrolyte can be used as the electrolyte of a fuel cell using a basic electrolyte.

At present, hydrogen, hydrazine, alcohol or the like is used as a fuel, whereas caustic potash is used as an electrolyte. A basic electrolyte such as polyvinylpyridine can be made into a paste or gel in the same way as in the above description so that it can be used as the electrolyte of a fuel cell.

A basic, high-molecular weight electrolyte such as polyvinylbenziltrimethyl ammonium may be used. This electrolyte produces a quaternary ammonium salt if the polystyrene is chloromethylated and treated with a tertiary amine.

First 1% of polystyrene and 0.3% of $ZnCl_2$ acting as a catalyst are dissolved in purified chloromethyl ether. This solution is chloromethylated at 50° C. for 2 hours, and the resultant produce is purified and dried.

The chloromethylated polystyrene is dissolved in dimethylformamine, and twice the equivalent amount of trimethylamine is blown into the resultant solution so that the reaction is conducted at room temperature (e.g., 15° C.) for one day. The product is poured into ether so that it is deposited and purified.

FIG. 8 shows an embodiment of the fuel supply method according to the present invention. The fuel electrode 52 and the oxidizer electrode 53 face each other across the electrolyte chamber 51, the fuel chamber 54 is arranged on the side of the fuel electrode 52 and the oxidizer chamber 61 is arranged on the side of the oxidizer electrode 53. In the fuel chamber 54, the fuel wick 56, which is made of a fibrous material of matted, woven or unwoven form such as carbon, acryl, polyamide or polypropylene, extends longitudinally from the fuel electrode 52 so that its lower end face is in contact with the bottom of the fuel tank 57.

When the fuel tank 57 is filled with liquid fuel 58, this fuel 58 rises through the fuel wick 56 by capillary action to fill the fuel chamber 54 with the liquid fuel 58 and supply the liquid fuel 58 to the fuel electrode 52 through the sections of the fibrous material 56, so that the electric power is generated by the electrochemical reaction. According to the present embodiment, an effect can be obtained that the liquid fuel 58 to be consumed is supplied continuously from the fuel tank 57 through the fuel wick 56 so that power generation can continue while there is liquid fuel 58 in the fuel tank 57.

The thickness of the fibrous member 56 is determined either by the suction characteristics of the liquid fuel 58, by the fibrous member 56, for example, the shape, size, etc., of the fuel electrode, or by the energy generated by the cell, i.e., the consumption of the fuel 58, but may desirably be between about 10 $\mu$m to 10 mm from a practical standpoint.

One application of a fuel supply making use of capillary action is the wick of an oil stove. In this case, however, the fuel sucked up from the fuel tank is gasified and burned at the tip of the wick. In the present invention, however, the fuel introduced from the fuel tank is supplied to the electrode surfaces from the surface of a material having capillary action. Thus, the present invention has an effect different from that of the wick of an oil stove.

The fuel chamber 54 can be made integral with the fuel tank 57. The space between the fuel chamber 54 and the fuel tank 57 is filled either with the fibrous wick 56 of matted, woven or unwoven carbon, acryl, polyamide or polypropylene, or a porous, inorganic fuel wick, which has been sinteted of an inorganic powder, e.g., of alumina or silica so as to have a number of pores, such that it extends at least from the lower end of the fuel electrode 52 to the bottom of the fuel tank 57.

When the fuel tank 57 is filled with the liquid fuel 58, this liquid fuel 58 is sucked from the fuel tank 57 through the fibrous member 56 or the porous, inorganic fuel wick by capillary action so that it is diffused into the fuel chamber by osmotic pressure until it is supplied to the fuel electrode 52 for power-generating purposes.

According to this embodiment, the liquid fuel is diffused at the rate of consumption by the fuel electrode 52 from the fuel tank 57 through the wick 56 or an inorganic fuel wick 56 into the fuel chamber 54 so that power generation continues while there is fuel liquid 58 in the fuel tank 57.

In a different embodiment, the fuel electrode 52 is constructed of an integrated structure of the porous substrate and the catalyst layer, and a porous substrate is used as the fuel wick. As an example, such porous substrate has a pore size from several tens $\mu$m to several hundreds $\mu$m, and the thickness thereof is 0.05 to 1 mm. By connecting the wick to the fuel 58 in the fuel tank 57, it is possible to supply the fuel electrode 52 with the fuel. This results in the advantages that the construction is simplified and the products can be dischargeed easily from the fuel electrode.

The fuel cell of FIG. 8 is equipped with a mechanism for controlling the rate of flow of the fuel supplied. A fuel controlling fastening 59 may also be provided for applying a mechanical pressure in the direction of the arrow to the fuel wick 56 rising from the fuel tank 57, which is interposed between the fuel tank 57 and the fuel chamber 54, thereby suppressing the supply of the fuel 58.

By compressing the fuel wick 56 by the use of the fuel controlling fastening 59, it is possible to reduce or stop the fuel being supplied from the fuel tank to the fuel chamber 54 by capillary action.

When the power generation is to be interrupted, therefore, by the use of this mechanism, the handling can be simplified because the fuel 58 can be left in the fuel tank 57.

The fuel supply can also be conducted more effectively in the following manner:

The fuel tank 57 is enlarged in the direction of the height thereof parallel to the cell structural parts such as the fuel electrode 52 or the oxidizer electrode 53, and is filled with the fuel 58. In this case, a pressure corresponding to the level of the liquid 58 is applied to the fuel wick 56 so that the height capable of supplying fuel is increased accordingly. As a result, even if the height of the battery is large when the area of the cell required is large, fuel supply is facilitated to provide the effect that a drop in the output due to a shortage of fuel can be prevented.

The above description of the embodiments has laid stress upon a methanol-air fuel cell. However, the present invention should not be limited to those embodiments, but can be applied to different fuel cells using other liquid fuels and oxidizers.

Similarly, the above description of the electrolyte composition has concentrated on a paste of an organic, high-molecular weight electrolyte composition. However, a fundamental object of the present invention, to prevent leakage or outflow of the electrolyte, can be achieved even if the organic, high-molecular weight electrolyte is in a solution.

Since the outflow of the electrolyte from the electrolyte chamber is prevented according to the present invention, a prolonged stability of the cell characteristics can be obtained and, in addition, the effect of preventing the electrolyte from leaking to the outside of the cell can be further improved. As a result, a suitable effect can be obtained especially for moving power sources and batteries which must be used in places subject to vibrations. Moreover, handling as a domestic power source is facilitated to provide a suitable power source.

With the present invention, the fuel can be supplied without any pump, differentiating it from the prior art using, e.g., a sulfuric acid electrolyte or an alkali electrolyte, in which the mixed solution (i.e., the anolyte) of the liquid fuel and the electrolyte is supplied by means of a pump. Since the pump capacity is usually about one mol of the fuel concentration, the energy consumed by the pump is much higher than that required for the supply of fuel alone. In this respect, according to the present invention, the supply of fuel alone or fuel with a small amount of water is made possible so that auxiliary machinery can be reduced. Furthermore, power losses due to short-circuiting between the electrodes by the electrolyte is avoided in the present invention to provide a large effect in view of the improvement in the efficiency and in the simplification of the construction.

When the fuel is gaseous, similarly, the outflow of liquid cannot be avoided if this electrolyte of, e.g., sulfuric acid or an alkali is used. According to the present invention, however, the outflow of electrolyte is eliminated so that the life of the cell can be extended.

What is claimed is:

1. A fuel cell, adapted to be operated at a temperature of from room temperature to about 100° C., comprising:
   (a) a fuel electrode placed so that a fuel in a fuel chamber is in contact therewith,
   (b) an oxidizer electrode placed so that an oxidizer in an oxidant chamber is in contact therewith, and
   (c) an electrolyte between said fuel electrode and said oxidizer electrode, the electrodes facing each other via said electrolyte, wherein said electrolyte is an organic, high-molecular weight electrolyte having a molecular weight of at least 1000, which electrolyte is at least partially soluble in water thereby to generate low-molecular weight ions and high-molecular weight ions being separated from each other in water, said ions being hardly permeable through the electrodes, whereby leakage of the electrolyte from between the electrodes can be avoided.

2. A fuel cell as set forth in claim 1, further including means for feeding fuel to the fuel chamber and means for feeding an oxidizer to the oxidizer chamber, and wherein at least one of the fuel feeding means and oxidizer feeding means includes means for feeding a liquid fuel to the fuel electrode or means for feeding a liquid oxidizer to the oxidizer electrode, respectively.

3. A fuel cell as set forth in claim 1, further including means for feeding liquid fuel to the fuel electrode, said means including means for feeding water contained with the liquid fuel.

4. A fuel cell as set forth in claim 1, wherein said high-molecular weight electrolyte is of a strong acid or base type.

5. A fuel cell as set forth in claim 1, wherein said high-molecular weight electrolyte contains water in which it is partially dissolved.

6. A fuel cell as set forth in claim 1, wherein said high-molecular weight electrolyte is in the form of a paste containing water and a thickening agent.

7. A fuel cell as set forth in claim 1, wherein said high-molecular weight electrolyte is mixed with an inactive thickening agent.

8. A fuel cell as set forth in claim 7, wherein said inactive thickening agent is an inorganic powder having a high specific resistance.

9. A fuel cell as set forth in claim 1, wherein said high-molecular weight electrolyte has a dissociated radical of a sulfonic or phosphine group.

10. A fuel cell as set forth in claim 1, wherein said high-molecular weight electrolyte has a dissociated radical of an amino group, a quaternary ammonium group, $-CH_2N(CH_3)_3$ Cl or $-CH_2N(CH_2CH_2OH)(CH_3)_2Cl$.

11. A fuel cell as set forth in claim 1, wherein at least one of the adjacent sides of said fuel electrode and said oxidizer electrode carry said organic, high-molecular weight electrolyte in the form of a film.

12. A fuel cell as set forth in claim 1, further comprising means for utilizing capillary action to supply said fuel electrode with fuel or a mixture of fuel and water.

13. A fuel cell as set forth in claim 12, wherein said means for utilizing capillary action comprises a porous member extending into a supply of said fuel or a mixture of fuel and water.

14. A fuel cell as set forth in claim 13, further comprising a fuel controlling fastening positioned adjacent said porous member for controlling the flow of fuel or mixture of fuel and water from said supply to said fuel electrode.

15. A fuel cell as set forth in claim 13, wherein said porous member also is a porous substrate for the fuel electrode, having a catalyst layer on the porous substrate.

16. A fuel cell as set forth in claim 1, further comprising at least one membrane positioned between the fuel electrode and oxidizer electrode.

17. A fuel cell as set forth in claim 16, wherein said membrane is an ion exchange film.

18. A fuel cell as set forth in claim 16, wherein the high-molecular weight electrolyte is in the form of a paste, and is coated on at least one surface of a membrane.

19. A fuel cell as set forth in claim 16, wherein the fuel cell contains two membranes, and the high-molecular weight electrolyte is sandwiched between the two membranes.

20. A fuel cell as set forth in claim 1, wherein a high-molecular weight residue of said high-molecular weight electrolyte is polystyrene, polyethylene, polyacryl, polymethacryl, a styrene-butadiene copolymer or a styrene-divinylbenzene copolymer.

21. A fuel cell as set forth in claim 2, wherein said means for feeding fuel to the fuel chamber is a means for feeding a mixture of methanol and water to the fuel chamber, whereby electric energy is generated as a result of electrochemical reaction producing carbon dioxide gas at said fuel electrode and water at said oxidizer electrode.

22. A fuel cell as set forth in claim 1, wherein said organic, high-molecular weight electrolyte has a minimum ionic conductivity of $4 \times 10^{-3}$ S/cm, where S is siemens ($\Omega^{-1}$).

23. A fuel cell as set forth in claim 7, wherein said thickening agent is utilized in an amount to provide a paste having a viscosity of $10^2$ and $10^4$ poises.

24. A fuel cell as set forth in claim 1, wherein the electrolyte also contains a low-molecular weight electrolyte in an amount of 5-20% by weight based on the total amount of the electrolyte.

25. A fuel cell as set forth in claim 1, wherein the electrolyte consists essentially of said organic, high-molecular weight electrolyte.

26. A fuel cell, adapted to operate at a temperature from room temperature to about 100° C., comprising:
  (a) a fuel electrode adapted to be placed in contact with a fuel in a fuel chamber,
  (b) an oxidizer electrode adapted to be placed so that an oxidizer gas in an oxidant chamber is in contact therewith, and
  (c) an electrolyte between said fuel electrode and said oxidizer electrode, said electrodes facing each other via the electrolyte, wherein said electrolyte is an organic, high-molecular weight electrolyte having a molecular weight sufficiently high such that said organic, high-molecular weight electrolyte does not leak out from between the electrodes, which high-molecular weight electrolyte is at least partially soluble in water thereby to generate low-molecular weight ions and high-molecular weight ions being separated from each other in water, said ions being hardly permeable through the electrodes, whereby electric energy is generated as a result of electrochemical reaction at the electrodes.

* * * * *